US009773583B2

(12) United States Patent
Leach et al.

(10) Patent No.: US 9,773,583 B2
(45) Date of Patent: Sep. 26, 2017

(54) CONTINOUSLY TRANSPOSED CONDUCTOR

(71) Applicant: Essex Group, Inc., Atlanta, GA (US)

(72) Inventors: Matthew Leach, Fort Wayne, IN (US); Gregory S. Caudill, Fort Wayne, IN (US)

(73) Assignee: Essex Group, Inc., Fort Wayne, IN (US)

( * ) Notice: Subject to any disclaimer, the term of this patent is extended or adjusted under 35 U.S.C. 154(b) by 533 days.

(21) Appl. No.: 14/260,563

(22) Filed: Apr. 24, 2014

(65) Prior Publication Data

US 2015/0310960 A1    Oct. 29, 2015

(51) Int. Cl.
| | |
|---|---|
| H01R 4/00 | (2006.01) |
| H02G 3/06 | (2006.01) |
| H02G 15/08 | (2006.01) |
| H01B 3/30 | (2006.01) |
| H01B 7/02 | (2006.01) |
| H01B 13/00 | (2006.01) |
| H01F 27/28 | (2006.01) |
| H02K 3/28 | (2006.01) |
| H02K 3/32 | (2006.01) |
| H01B 3/42 | (2006.01) |
| H01B 7/30 | (2006.01) |
| H01B 13/02 | (2006.01) |
| H01B 13/14 | (2006.01) |

(52) U.S. Cl.
CPC ............. *H01B 3/301* (2013.01); *H01B 3/307* (2013.01); *H01B 3/427* (2013.01); *H01B 7/02* (2013.01); *H01B 7/306* (2013.01); *H01B 13/0013* (2013.01); *H01B 13/0278* (2013.01); *H01B 13/14* (2013.01); *H01F 27/2823* (2013.01); *H02K 3/28* (2013.01); *H02K 3/32* (2013.01); *H01F 2027/2838* (2013.01)

(58) Field of Classification Search
CPC ........ H01B 3/301; H01B 3/307; H01B 3/427; H01B 7/02; H01B 7/306; H01B 13/0013; H01B 13/14; H01B 13/0278; H01F 27/323; H01F 27/2823; H01F 41/10; H01F 41/122; H01F 2027/2838; H02K 3/28; H02K 3/32
USPC ......... 174/10, 34, 70 R, 88 R, 120 R, 125.1; 310/201, 208; 336/187
See application file for complete search history.

(56) References Cited

U.S. PATENT DOCUMENTS

| | | | | |
|---|---|---|---|---|
| 2,152,706 | A * | 4/1939 | Mougey | H01B 11/08 174/103 |
| 4,247,504 | A * | 1/1981 | Karppo | B29C 47/128 174/120 SC |
| 5,329,569 | A * | 7/1994 | Spielman | G21K 1/10 378/140 |

(Continued)

OTHER PUBLICATIONS

International Search Report for PCT/US15/27207, filed on Apr. 23, 2015.

(Continued)

*Primary Examiner* — Timothy Thompson
*Assistant Examiner* — Guillermo Egoavil

(57) ABSTRACT

Continuously transposed conductor ("CTC") cables are described. A CTC cable may include a plurality of electrically insulated strands connected in parallel at their ends. Additionally, each strand may include one or more conductors and an extruded insulation layer formed at least partially around the one or more conductors.

30 Claims, 5 Drawing Sheets

(56) References Cited

U.S. PATENT DOCUMENTS

| | | | |
|---|---|---|---|
| 5,786,086 A | 7/1998 | Frihart et al. | |
| 5,962,945 A * | 10/1999 | Krenzer | H01F 27/323 |
| | | | 174/10 |
| 6,153,270 A * | 11/2000 | Russmann | B05D 7/51 |
| | | | 427/120 |
| 2002/0190419 A1 | 12/2002 | Albrecht et al. | |
| 2004/0245010 A1 * | 12/2004 | Banks | H01F 27/323 |
| | | | 174/120 R |
| 2006/0057380 A1 * | 3/2006 | Weinberg | C08L 81/06 |
| | | | 428/375 |
| 2006/0105157 A1 * | 5/2006 | Lorentz | D01F 6/905 |
| | | | 428/292.1 |
| 2008/0187759 A1 * | 8/2008 | Fukuda | H01B 3/301 |
| | | | 428/411.1 |
| 2012/0060634 A1 * | 3/2012 | Ueno | F16C 19/163 |
| | | | 74/458 |
| 2014/0048309 A1 | 2/2014 | Kihara et al. | |
| 2015/0243410 A1 * | 8/2015 | Knerr | H02K 3/32 |
| | | | 310/198 |

OTHER PUBLICATIONS

"Chemical Resistance Chart" Plastics International, Feb. 1, 2001.

* cited by examiner

United States Patent US 9,773,583 B2

CONTINUOUSLY TRANSPOSED CONDUCTOR

TECHNICAL FIELD

Embodiments of the disclosure relate generally to continuously transposed conductors and, more particularly, to continuously transposed conductors formed with extruded insulation materials.

BACKGROUND

Continuously transposed conductors ("CTCs") or CTC cables include a number of multiple parallel strands that are individually insulated and formed into an assembly. Typically, the strands of a CTC cable are formed into two interposed stacks, and each strand is transposed in turn to each position within the cable. Each strand may successively and repeatedly take on each possible position within a cross-section of the CTC cable. CTC cables are typically used to form windings in electrical devices, such as electrical transformers.

The individual strands of a CTC cable are typically formed by applying one or more insulating enamel coatings onto an elongated conductor. The traditional insulation for each strand is polyvinyl acetate ("PVA"), and the PVA is applied in successive layers as the strand makes multiple passes through an enameling oven. Each pass through the oven facilitates evaporation of solvents and curing of the PVA layer, and multiple passes are required to achieve a desired enamel film thickness and desired enamel properties.

The traditional method of enameling individual strands for a CTC cable is problematic for several reasons. First, the enamel typically only contains between 15% and 23% solids by volume at the time of application. In other words, 76% to 85% of the applied material typically consists of solvent that is present only for the purpose of liquefaction and transportation of the enamel. Conventional solvents are typically highly volatile materials that must be handled with care and disposed of in a manner that satisfies environmental regulations. The formed enamels are also often subject to environmental regulations, which contributes to higher disposal costs. Additionally, during formation of an enamel layer, significant heating energy is required to drive off the solvents from the enamel and to crosslink the enamel to provide desired final properties. Typically, only about 10% to 15% of the applied heat is actually used in the enamel curing process, resulting in a relatively energy inefficient process. The heat and time required to optimize the evaporation rate required to drive off the solvents from the enamel also impairs wire line speed and the resulting throughput of the enameling oven. Accordingly, there is an opportunity for improved CTC cables.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

DETAILED DESCRIPTION

Various embodiments of the present disclosure are directed to continuously transposed conductors ("CTCs") and/or CTC cables in which one or more individually insulated conductors or strands include an extruded insulation material. For example, a strand may be formed with an extruded polymeric insulation, such as an extruded thermoplastic material or another suitable extruded resin material. Extruded insulation material(s) may be applied substantially free of solvents, thereby eliminating or reducing environmental concerns associated with the use of solvents. Additionally, it may not be necessary to heat cure certain extruded insulation material(s) to achieve cross linking or other desired properties. A desired thickness or build of extruded insulation materials can also be achieved in fewer passes than conventional enamel insulation materials. For example, a desired thickness may be achieved in a single pass. As a result, the energy required to form a CTC strand may be lower than that required to produce a conventional enameled strand. Additionally, CTC strands may be produced at a relatively higher production rate.

Embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
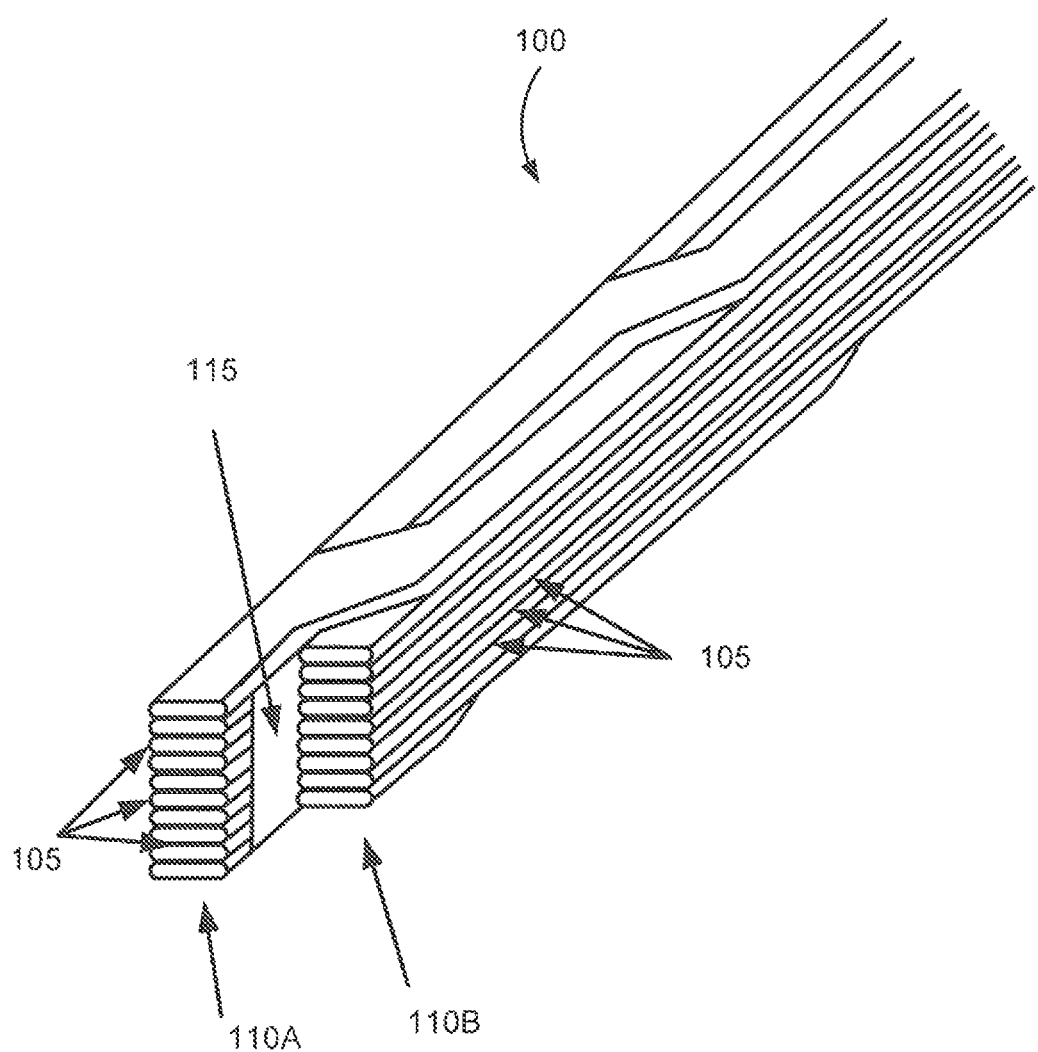
FIG. 1 is a perspective view of an example CTC cable, according to an illustrative embodiment of the disclosure.

With reference to FIG. 1, a perspective view of an example CTC cable 100 is illustrated in accordance with an embodiment of the disclosure. The CTC cable 100 (also referred to as a multiple parallel conductor cable) may be formed from a plurality of strands 105. In certain embodiments, the strands may be referred to as partial conductors for an overall CTC structure. Additionally, in certain embodiments, each strand may include a single individually insulated conductor. In other embodiments, one or more strands may include a plurality of individually insulated conductors that have been bonded together. The CTC cable 100 may be formed with any suitable number of strands 105 as desired in various embodiments. For example, the CTC cable may be formed with between approximately five (5) and approximately eighty-five (85) strands.

As shown in FIG. 1, the strands 105 may be arranged into two stacks, such as side-by-side stacks 110A, 110B. At least a portion of the strands 105 may then be interposed between the two stacks 110A, 110B. For example, the strands 105 may be interposed such that each strand successively and repeatedly takes on each possible position within a cross-section of the CTC cable 100. Additionally, in certain embodiments, the plurality of strands 105 may be connected in parallel at their ends. Optionally, a suitable separator 115 may be positioned between the two stacks 110A, 110B. For example, a paper strip may be positioned between the two stacks 110A, 110B.

Each strand (hereinafter referred to individually as strand 105) may include one or more insulated conductors. The conductors may include any desired cross-sectional shape, such as the illustrated approximately rectangular shapes. Additionally, according to an aspect of the disclosure, at least a portion of the strands 105 may include an extruded insulation material. In certain embodiments, a bond layer or bond coating may additionally be formed on a portion or all of the strands 105. The bond layer(s) may facilitate future thermosetting of the strands 105, for example, when the CTC cable 100 is incorporated into an electrical device.

The CTC cable 100 illustrated in FIG. 1 may be suitable for incorporation into a wide variety of suitable electrical devices. For example, the CTC cable 100 may be suitable for incorporation into an electrical transformer, an electric motor, an electric generator, and/or any other rotating electric machine. Additionally, the CTC cable 100 described above with reference to FIG. 1 is provided by way of example only. A wide variety of alternatives could be made to the illustrated cable 100 as desired in various embodiments. For example, a different number of strands, different types of strands, and/or a different strand configuration may be formed. The present disclosure envisions various CTC cable strand constructions that can be incorporated into a wide variety of different CTC cables.

Figure 2A:
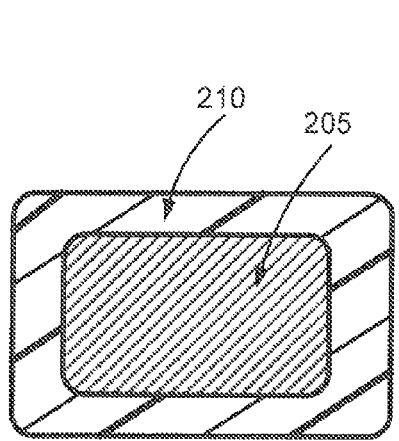
FIG. 2A is a cross-sectional view of an example CTC cable strand that includes extruded insulation, according to an illustrative embodiment of the disclosure.
Figure 2B:
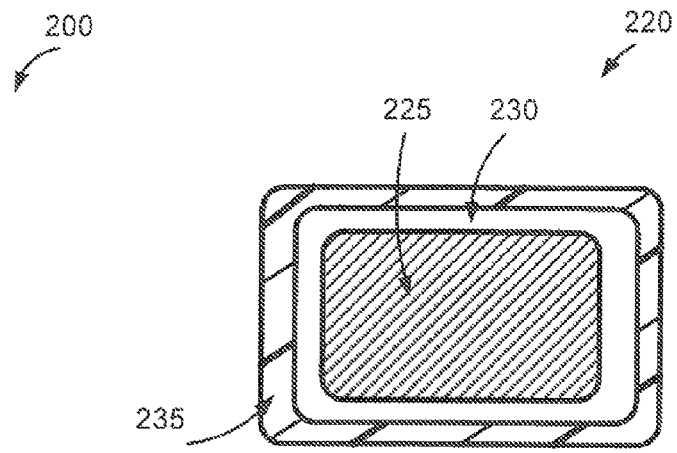
FIG. 2B is a cross-sectional view of an example CTC cable strand that includes extruded insulation formed over a base layer, according to an illustrative embodiment of the disclosure.
Figure 2C:
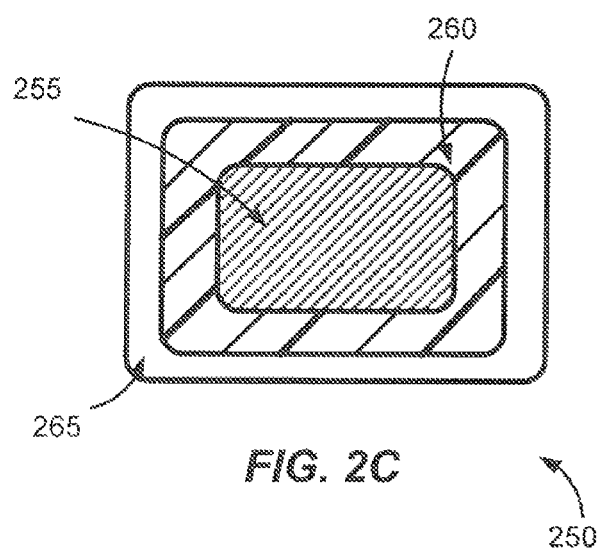
FIG. 2C is a cross-sectional view of an example CTC cable strand that includes a bond layer formed on extruded insulation, according to an illustrative embodiment of the disclosure.

FIGS. 2A-2C illustrate cross-sectional views of example CTC cable strands that may be incorporated into CTC cables, such as the CTC cable 100 illustrated in FIG. 1. Each of the example strands illustrated in FIGS. 2A-2C incorporate extruded insulation material. FIG. 2A illustrates an example strand 200 in which an extruded insulation material is formed directly on a conductor. FIG. 2B illustrates an example strand 220 in which one or more base layers of insulating material are formed on a conductor, and an extruded insulation material is formed over the one or more base layers. FIG. 2C illustrates an example strand 250 in which an extruded insulation material is formed on a conductor, and a bond layer is formed on the extruded insulation material. Each of the example strands 200, 220, 250 are discussed in greater detail below; however, it will be appreciated that other strand configurations may be formed in addition to those illustrated in FIGS. 2A-2C.

Turning first to FIG. 2A, a cross-sectional view of a first example CTC cable strand 200 is illustrated. The strand 200 may include a conductor 205, and extruded insulation material 210 may be formed around the conductor 205. The conductor 205 may be formed from a wide variety of suitable materials and or combinations of materials. For example, the conductor 205 may be formed from copper, aluminum, annealed copper, oxygen-free copper, silver-plated copper, silver, gold, a conductive alloy, or any other suitable electrically conductive material. Additionally, the conductor 205 may be formed with any suitable dimensions and/or cross-sectional shapes. As shown, the conductor 205 may have an approximately rectangular cross-sectional shape. However, the conductor 205 may be formed with a wide variety of other cross-sectional shapes, such as a rectangular shape (i.e., a rectangle with sharp rather than rounded corners), a square shape, an approximately square shape, an elliptical or oval shape, etc. Additionally, as desired, the conductor 205 may have corners that are rounded, sharp, smoothed, curved, angled, truncated, or otherwise formed.

In addition, the conductor 205 may be formed with any suitable dimensions. For the illustrated rectangular conductor 205, the longer sides may be between approximately 0.05 inches (1,270 µm) and approximately 1.0 inches (25,400 µm), and the shorter sides may be between approximately 0.03 inches (762 µm) and approximately 0.50 inches (12,700 µm). Other suitable dimensions may be utilized as desired, and the described dimensions are provided by way of example only.

A wide variety of suitable methods and/or techniques may be utilized to form, produce, or otherwise provide a conductor 205. In various embodiments, a conductor 205 may be formed via one or more drawing, rolling, and/or continuous extrusion processes. For example, a conductor 205 may be formed by drawing an input material (e.g., a larger conductor, rod stock, etc.) with one or more dies in order to reduce the size of the input material to desired dimensions. As desired, one or more flatteners and/or rollers may be used to modify the cross-sectional shape of the input material before and/or after drawing the input material through any of the dies. In certain embodiments, a suitable rod mill or rod breakdown machine may draw stock through one or more dies in order to reduce the dimensions of the rod stock. As desired, one or more flatteners and/or rollers may be utilized to flatten desired surfaces of the drawn material. As another example, a continuous extrusion or conform machine may receive input material and process and/or manipulate the input material to produce a desired conductor via extrusion. In other embodiments, a preformed conductor may be obtained from an external source. As desired, one or more suitable methods of work hardening may be applied to achieve desired tensile properties of a conductor. These methods may include, for example work hardening by bending a conductor around rollers, etc.

In certain embodiments, the conductor 205 may be formed in tandem with the application of insulation material onto the conductor. In other words, conductor formation and application of insulation material (e.g., extruded insulation material, etc.) may be conducted in tandem. The processing and/or line speeds of the conductor formation devices and the devices that apply insulation material(s) may be synchronized in order to facilitate the tandem processing. As desired, this synchronization may assist in maintaining a desired thickness of the insulation material(s); controlling the temperature of the conductor prior to, during, and/or after application (e.g., extrusion, etc.) of the insulation material(s); and/or achieving other desired characteristics associated with the strand 200. In other embodiments, a conductor 205 with desired dimensions may be preformed or obtained from an external source. Insulation material may then be applied or otherwise formed on the conductor 205 in an off-line manner.

With continued reference to FIG. 2A, extruded insulation material 210 may be formed around the conductor 205. An extrusion process may result in the formation of an insulation layer from approximately 100% solid material. In other words, an extruded insulation layer may be substantially free of any solvents. As a result, the application of an extruded layer may be less energy intensive than the application of conventional enamel layers as there is no need to evaporate solvents. In certain embodiments, the extruded insulation material 210 may be formed as a single layer. In other words, a single extrusion step may be performed during formation of the extruded insulation material 210. In other embodiments, the extruded insulation material 210 may be formed via a plurality of extrusion steps to include a plurality of layers. Any number of layers may be utilized as desired, such as two, three, four, or more layers. As desired, each layer may be formed from the same material or, alternatively, at least two layers may be formed from different materials. Additionally, as desired in certain embodiments, one or more other suitable materials may be positioned between layers of extruded materials, such as adhesives, other insulation materials, etc.

The extruded insulation material 210 included in an extruded layer may be formed from a wide variety of suitable materials and/or combination of materials. In certain embodiments, extruded insulation material 210 may be formed from one or more suitable polymeric materials, thermoplastic resins or materials, and/or other suitable materials. For example, the extruded insulation material 210 may be formed from and/or include at least one of polysulfone, polyphyenylsulfone ("PPSU"), polysulfide, polyphenylene sulfide ("PPS"), polyetherketone ("PEK"), polyether-etherketone ("PEEK"), polyaryletherketone ("PAEK"), polyamide etherketone, thermoplastic polyimide, aromatic polyamide, extruded polyester, extruded polyketone, etc. In certain embodiments, the extruded insulation material 210 may be formed from or include a suitable fluoropolymer material, such as fluorinated ethylene propylene ("FEP"), polytetrafluoroethylene ("PTFE" such as Teflon®, etc.), perfluoroalkoxy alkane ("PFA"), and/or ethylene tetrafluoroethylene ("ETFE"). In certain embodiments, the extruded material may contain one or more thermoplastic resin materials (e.g., PEEK, PAEK, etc.) in combination with polytetrafluoroethylene ("PTFE") or another suitable fluoropolymer. In various embodiments, the extruded insulation material 210 may be formed as a single material, a copolymer, a blend of materials, or as any other suitable combination of materials.

The extruded insulation material 210, or any given layer of the extruded insulation material 210, may be formed with any suitable thickness as desired in various embodiments. For example, a layer of extruded insulation material 210 may be formed with a thickness between approximately 0.001 inches (25 μm) and approximately 0.090 inches (2286 μm). In certain embodiments, a layer of extruded insulation material 210 may have a thickness between approximately 0.001 inches (25 μm) and approximately 0.030 inches (762 μm). Other thicknesses may be utilized as desired. Additionally, in certain embodiments, the extruded insulation material 210 may be formed to have a cross-sectional shape that is similar to that of the underlying conductor 205. For example, if the conductor 205 has an approximately rectangular cross-sectional shape, the extruded insulation material 210 may be formed to have an approximately rectangular cross-sectional shape. In other embodiments, the extruded insulation material 210 may be formed with a cross-sectional shape that varies from that of the underlying conductor 205. As one non-limiting example, the conductor 205 may be formed with an elliptical cross-sectional shape while the extruded insulation material 210 is formed with an approximately rectangular cross-sectional shape. A wide variety of other suitable configurations will be appreciated.

In certain embodiments, extruded insulation material may be formed completely around a strand 200. In other embodiments, extruded insulation material may be formed partially around a strand 200. For example, extruded insulation material may be formed on edges or surfaces of a strand that may contact one or more adjacent strands when the strands are incorporated into a CTC cable or multiple parallel conductor.

Additionally, the strand 200 and/or a CTC cable that incorporates the strand 200 may have a relatively high thermal index rating. In other words, the strand 200 or CTC cable may be suitable for relatively continuous use at elevated temperatures without the insulation breaking down. In certain embodiments, the strand 200 may have a thermal index rating of at least approximately 200° C., and therefore, be suitable for relatively continuous use at temperatures up to approximately 200° C. without degradation of the insulation. In other embodiments, the strand 200 may have a thermal index rating of at least approximately 220° C., approximately 230° C., approximately 240° C., or higher. Other suitable thermal index ratings may be achieved with extruded insulation, such as a thermal index rating of at least approximately 105° C., approximately 120° C., approximately 150° C., approximately 175° C., etc. Additionally, the term relatively continuous use may refer to a suitable time period that may be used to test the integrity of the strand 200, such as a time period of 1,000 hours, 5,000 hours, 20,000 hours or a time period determined from an applicable standard (e.g., ASTM 2307, etc.). In an example test procedure, the strand 200 may be subjected to an elevated operating temperature for a given time period and, following the time period, the integrity of the insulation (e.g., dielectric strength, partial discharge inception voltage, etc.) may be tested.

Additionally, in certain embodiments, the extrusion process may be controlled such that the extruded insulation material 210 has a relatively uniform thickness along a longitudinal length of the strand 200. In other words, the extruded insulation material 210 may be formed with a concentricity that is approximately close to 1.0. The concentricity of the extruded insulation material 210 is the ratio of the thickness of the material to the thinness of the material at any given cross-sectional along a longitudinal length of the strand 200. In certain embodiments the extruded insulation material 210 may be formed with a concentricity between approximately 1.1 and approximately 1.8. For example, the extruded insulation material 210 may be formed with a concentricity between approximately 1.1 and approximately 1.5 or a concentricity between approximately 1.1 and 1.3.

In certain embodiments, the extruded insulation material 210 may be formed directly on the conductor 205. In other words, the extruded insulation material 210 may be formed on the underlying conductor 205 without the use of a bonding agent, adhesion promoter, or adhesive layer. As desired, the temperature of the conductor 205 may be controlled prior to the application of the extruded insulation material 210 to eliminate the need for an adhesive layer. As a result, the extruded insulation material 210 may be bonded to the conductor 205 without use of a separate adhesive. In other embodiments, one or more other materials may be positioned between the extruded insulation material 210 and the conductor 205. For example, an adhesive layer, one or more base layers of insulation material, a semi-conductive layer, and/or another suitable layer may be positioned between the conductor 205 and the extruded insulation material 210.

As discussed in greater detail below with reference to FIG. 2C, in certain embodiments, a bond layer or bonding layer may be formed at least partially around the extruded insulation material 210. The bond layer may include any suitable material and/or combination of materials that facilitates thermosetting of the strand 200. Additionally, as discussed in greater detail below with reference to FIG. 2B, in certain embodiments, one or more base layers of insulation material may be formed under the extruded insulation material 210. Indeed, a wide variety of suitable modifications may be made to the strand 200 illustrated in FIG. 2.

Turning to FIG. 2B, another example CTC cable strand 220 is illustrated. In the strand 220 of FIG. 2B, one or more base layers of material 230 may be formed on a conductor 225, and an extruded insulation material 235 may be formed over the one or more base layers 230. The conductor 225 and the extruded insulation material 235 may be similar to those discussed above with reference to FIG. 2A. The base layer(s) 230 may include any number of layers of suitable material, such as one or more layers of adhesive material, one or more layers of polymeric insulation material, one or more semi-conductive layers, etc.

In the event that the base layer(s) 230 include insulation material, a wide variety of different types of non-extruded insulation materials and/or combinations of materials may be utilized. Additionally, any number of layers of insulation material may be utilized. In the event that multiple layers are utilized, the layers may be formed from the same material (or combination of materials) or, alternatively, at least two layers may be formed from different materials.

In certain embodiments, the base layer(s) 230 may include one or more layers of enamel. In other words, the strand 220 may include one or more layers of enamel formed on the conductor 225, and extruded insulation material 235 may be formed over the enamel. However, even if enamel is utilized, in certain embodiments, the amount of enamel may be less than that utilized in conventional CTC cable strands. An enamel layer is typically formed by applying a polymeric varnish to the conductor 225 and then baking the conductor 225 in a suitable enameling oven or furnace. Typically, the polymeric varnish includes between approximately 12% and approximately 30% solid material (although other percentages can be used) mixed with one or more solvents. Once the polymeric varnish is applied, the solvents are typically evaporated by an enameling oven. As desired, multiple layers of enamel may be applied to the conductor 225 until a desired number of enamel coats have been applied and/or until a desired enamel thickness or build has been achieved.

A wide variety of different types of polymeric materials may be utilized as desired to form an enamel layer. Examples of suitable materials include, but are not limited to, polyvinyl acetal-phenolic, polyimide, polyamideimide, amideimide, polyester, polyesterimide, polysulfone, polyphenylenesulfone, polysulfide, polyphenylenesulfide, polyetherimide, polyamide, etc. In certain embodiments, a polyimide-based material (e.g., polyimide, polyamideimide, etc.) may be utilized, as these materials typically have relatively high heat resistance. Additionally, in certain embodiments, an enamel layer may be formed as a mixture of two or more materials. Further, in certain embodiments, different enamel layers may be formed from the same material(s) or from different materials.

In other embodiments, the base layer(s) 230 may include a suitable wrap or tape, such as a polymeric tape, such as a polyimide tape. As, additional materials or additives (e.g., another polymeric material, etc.) may be incorporated into, embedded into, or adhered to a tape. For example, a polyimide tape may include a fluorinated ethylene propylene (FEP) polymer layer (or FEP material) formed on one or both sides of the tape. Additionally, a tape may include a wide variety of suitable dimensions, such as any suitable thickness and/or width.

In yet other embodiments, the base layer(s) 230 may include one or more semi-conductive layers. Alternatively, semi-conductive material may be incorporated into an extruded insulation layer or formed on top of an extruded insulation layer. A semi-conductive layer may be formed from a wide variety of suitable materials and/or combinations of materials. In certain embodiments, a semi-conductive layer may be formed from a material that combines one or more suitable filler materials with one or more base materials. For example, semi-conductive and/or conductive filler material may be combined with one or more suitable base materials. Examples of suitable filler materials include, but are not limited to, suitable inorganic materials such as metallic materials and/or metal oxides (e.g., zinc, copper, aluminum, nickel, tin oxide, chromium, potassium titanate, etc.), and/or carbon black; suitable organic materials such as polyaniline, polyacetylene, polyphenylene, polypyrrole, other electrically conductive particles; and/or any suitable combination of materials. The particles of the filler material may have any suitable dimensions, such as any suitable diameters. In certain embodiments, the filler material may include nanoparticles. Examples of suitable base materials may include, but are not limited to, polyvinyl acetal-phenolic, polyimide, polyamideimide, amideimide, polyester, polyesterimide, polysulfone, polyphenylenesulfone, polysulfide, polyphenylenesulfide, polyetherimide, polyamide, or any other suitably stable high temperature thermoplastic or other material. Further, any suitable blend or mixture ratio between filler material and base material may be utilized. For example, the semi-conductive layer may include between approximately 3 percent and approximately 20 percent filler material(s) by weight, although other concentrations may be used (e.g., between approximately 5 percent and approximately 50 percent, between approximately 7 percent and approximately 40 percent, etc.).

Additionally, a semi-conductive layer may have any suitable thickness. In certain embodiments, one or more semi-conductive layers may be formed in a similar manner as an enamel layer. For example, a varnish including semi-conductive material may be applied, and the varnish may be heated by one or more suitable heating devices, such as an enameling oven. In other embodiments, one or more semi-conductive layers may be extruded. As a result of incorporating a semi-conductive layer into a strand 220, it may be possible to improve the performance of the strand 220. A semi-conductive layer may assist in equalizing voltage stresses in the insulation and/or dissipating corona discharges at or near the conductor 225. This dissipation or bleeding off of corona discharges and/or electrical stresses may improve dielectric performance and/or increase the partial discharge inception voltage ("PDIV") of the strand 220.

Similar to the extruded insulation material, application of one or more base layers 230 (e.g., an enamel layer, a semi-conductive layer, etc.) may be controlled to result in a desired concentricity. For example, any base layer may have a concentricity between approximately 1.1 and approximately 1.8, such as a concentricity between approximately 1.1 and approximately 1.5 or a concentricity between approximately 1.1 and 1.3. Additionally, the combined layers formed on a strand may have a concentricity between approximately 1.1 and approximately 1.8, such as a concentricity between approximately 1.1 and approximately 1.5 or a concentricity between approximately 1.1 and 1.3.

Other embodiments may include any suitable combination of enamel, semi-conductive layers, and/or tapes. Indeed, a wide variety of different base layer configurations may be incorporated into CTC strands. Alternatively, as set forth above with reference to FIG. 2A, a strand may be formed without any base layers. Additionally, as desired, a suitable bond layer may be formed at least partially around a strand.

FIG. 2C illustrates yet another example CTC cable strand 250. In the strand 250 of FIG. 2C, extruded insulation material 260 may be formed around a conductor 255, and one or more bond layers 265 may be formed on the extruded insulation material 260. As desired, one or more base layers (not shown) could optionally be positioned between the extruded insulation material 260 and the conductor 255, as discussed above with reference to FIG. 2B. Additionally, the conductor 255 and the extruded insulation material 260 may be similar to those discussed above with reference to FIG. 2A.

The bond layer(s) 265 may include one or more layers of a suitable material that facilitates thermosetting of a CTC strand 250. In any given CTC, approximately ninety percent (90%) or more of the strands may include a bond layer. A bond layer 265 may be formed at least partially around a CTC strand 250. Additionally, a bond layer 265 may be formed from a material that has a lower melt temperature than the primary insulation (e.g., the extruded insulation material) of the strand 250. In this regard, once a winding or other desired structure is formed from the CTC cable, the cable may be heated in such a manner that the bond layer 265 is activated to assist in maintaining a desired structural shape.

A bond layer 265 may be formed from a wide variety of suitable materials and/or combination of materials. In certain embodiments, the bond layer 265 may be formed from an epoxy coating, hot melt adhesive, or any other suitable thermosetting material. Examples of suitable materials that may be utilized to form a bond layer 265 include, but are not limited to, penoxy resin, cross-linking phenoxy, phenoxy associates, polysulfone, and/or similar materials. Additionally, a bond layer 265 may be formed with any suitable thickness as desired. For example, a bond layer may be formed with a thickness between approximately 0.0005 inches (13 µm) and approximately 0.010 inches (254 µm). Other thicknesses may be utilized as desired.

The strands 200, 220, 250 described above with reference to FIGS. 2A-2C are provided by way of example only. A wide variety of alternatives could be made to the illustrated strands as desired in various embodiments. For example, as explained in greater detail below with reference to FIGS. 3A-3B, a strand may be formed to include a plurality of conductors. Indeed, the present disclosure envisions a wide variety of suitable magnet wire constructions.

As a result of forming a CTC strand with extruded insulation material, an amount of solvent utilized in the construction of the strand may be reduced relative to conventional enameled strands. In certain embodiments, the use of solvents may be substantially eliminated. The reduction or elimination of solvents may minimize environmental impact, as there is less need to dispose of solvent waste. Additionally, an amount of energy required to form a strand may be reduced. As set forth above, traditional enameling processes are relatively inefficient and require significant energy for heat curing. By contrast, an extrusion process is more energy efficient, and therefore, potentially more cost effective. Thus, the reduction or elimination of enamel utilized to form a strand leads to a more energy efficient process.

Additionally, the use of extruded insulation material may result in a CTC strand and/or CTC cable that has relatively higher mechanical and/or electrical performance than conventional enameled strands. In certain embodiments, the use of extruded insulation material may result in a strand having a relatively higher dielectric strength and/or partial discharge inception voltage ("PDIV"). Additionally, in certain embodiments, the use of extruded insulation material may result in a strand that is relatively more durable mechanically and/or relatively more resistant to mechanical stresses. In certain embodiments, the use of extruded insulation materials may also result in a strand with a thermal index rating that is relatively higher than conventional strands. Certain extruded insulation materials may also be more resistant to ultraviolet ("UV") light damage than conventional enamel materials.

Additionally, in certain embodiments, strands that utilize extruded insulation may be hydrolytically stable and resistant to oils and/or liquids (e.g., transformer oil, cooling oils, mineral oils, etc.). The strands may be capable of satisfying a wide variety of oil resistance tests, such as the oil bomb test set forth in the American Society for Testing and Materials ("ASTM") D1676-03 standard entitled "Resistance to Insulating Liquids and Hydrolytic Stability of Film-Insulated Magnet Wire." Under the test, a strand is exposed to oil or another liquid at an elevated temperature (e.g., a temperature of 150° C. for approximately 2000 hours, etc.) in order to simulate actual use conditions and/or accelerated aging of the strand. After completion of the test, the strand is again tested for dielectric breakdown, PDIV, and a visual inspection for cracking may be performed.

A strand with extruded insulation material may also be relatively flexible while maintaining adhesion of the insulation layer(s), thereby permitting the strand to be bent or formed into relatively tight coils without the insulation cracking and/or separating. The strand may be capable of satisfying a wide variety of suitable flexibility test procedures, such as the test procedure 3.3.6 set forth in the National Electrical Manufacturers Association ("NEMA") MW 1000-2012 standard. In one example test, a specimen of a strand (e.g., a one meter long sample, etc.) may be elongated by approximately 25%. The sample may then be bent at least approximately 90° around a mandrel having a diameter of approximately 4.0 mm. After the bending, the sample may be inspected for cracks in the insulation. Additionally, the sample may be tested for dielectric breakdown, PDIV, and/or other desired performance characteristics. Other mandrel diameters may be utilized as desired, such as other mandrel diameters specified by the MW 1000-2012 standard and/or any other relevant standards.

A strand and/or CTC cable formed in accordance with embodiments of the disclosure may be suitable for a wide variety of applications. For example, the strand may be suitable for use in transformers, motors, generators, and/or any other suitable electrical devices that incorporate CTC windings.

Figure 3A:
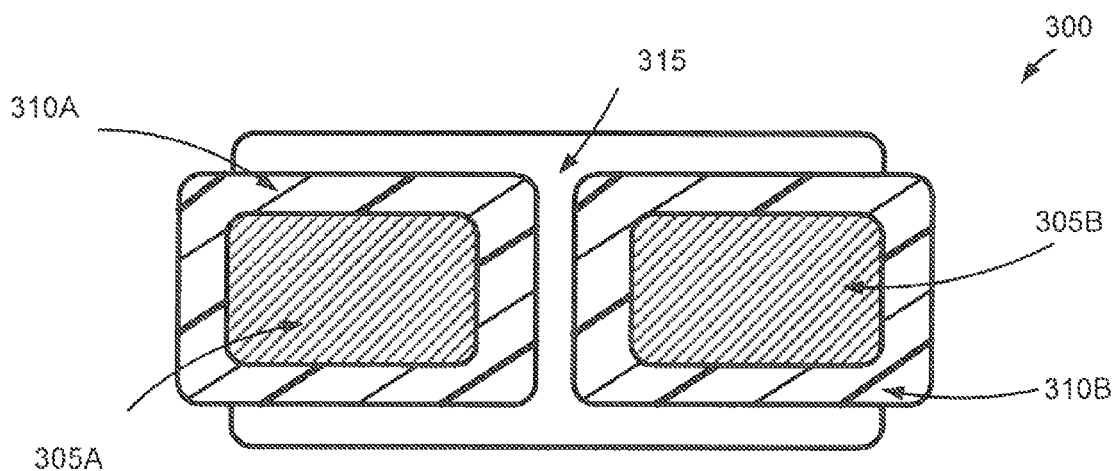
FIGS. 3A-3B illustrate example cross-sectional shapes of CTC strands that include a plurality of joined conductors, according to various illustrative embodiments of the disclosure.
Figure 3B:
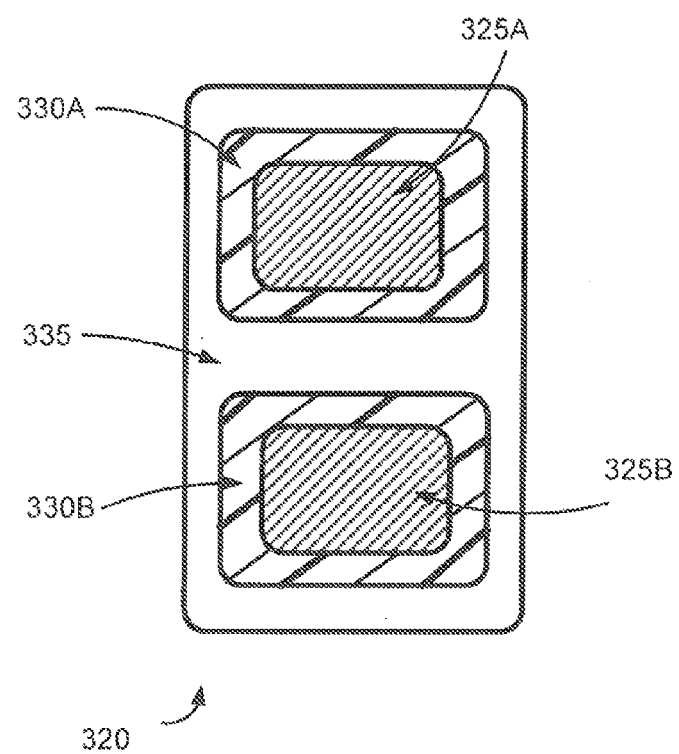

Although the example strands 200, 220, 250 illustrated in FIGS. 2A-2C incorporate a single conductor, in certain embodiments, a strand may include a plurality of individually insulated conductors that are bonded together. FIGS. 3A-3B illustrate example cross-sectional shapes of CTC strands that include a plurality of joined conductors, according to various illustrative embodiments of the disclosure. Turning first to FIG. 3A, a first example CTC strand 300 is illustrated. The illustrated strand 300 includes two conductors 305A, 305B, and each conductor may be electrically isolated from the other conductor. Additionally, the two conductors 305A, 305B may be bonded together.

As shown, respective insulation material may be formed around each of the two conductors 305A, 305B. For example, first insulation material 310A may be formed around the first conductor 305A, and second insulation material 310B may be formed around the second conductor 310B. According to an aspect of the disclosure, the insulation material may include extruded insulation material, although other materials (e.g., enamels, tapes, semi-conductive materials, etc.) may also be incorporated into the insulation as desired. Once insulation has been formed around each conductor 305A, 305B, the two conductors 305A, 305B may be joined together side by side with a suitable joining coating 315. A wide variety of suitable materials and/or combination of materials may be utilized to form a joining coating 315. These materials include, but are not limited to, epoxy materials, thermoplastic resins, extruded materials, and/or adhesive materials.

In certain embodiments, the joining coating 315 may be formed between and/or around the two conductors 305A, 305B. As shown, in other embodiments, the joining coating 315 may be formed between and partially around (e.g., at least partially along the flat surfaces) the two conductors 305A, 305B. In yet other embodiments, the joining coating 315 may be formed between the two conductors 305A, 305B. In yet other embodiments, a separate joining coating may not be utilized. For example, when extruded insulation material is formed, the extruded material may be formed between and around the conductors 305A, 305B in order to both individually insulate and join the conductors 305A, 305B.

FIG. 3B illustrates a second example CTC strand 320 that includes a plurality of joined conductors. The strand 320 of FIG. 3B may be similar to that of FIG. 3A; however, in the strand 320 of FIG. 3B, the two conductors 325A, 325B may be positioned flat by flat (e.g., the conductors are joined along the longer or flat edges) rather than side by side. Similar to the strand 300 of FIG. 3A, each conductor 325A, 325B may include respective insulation material 330A, 330B. Additionally, the two conductors may be joined together via a suitable joining coating 335. As shown, the joining coating 335 may be positioned between and around the two conductors; however, as set forth above, different joining coating configurations may be utilized. In other embodiments, the two conductors 325A, 325B may be joined together without a separate joining coating.

Although the example strands 300, 320 illustrated in FIGS. 3A and 3B depict two conductor strands, in other embodiments, any desired number of conductors may be incorporated into a strand. As a result of incorporating a plurality of conductors into a strand, it may be possible to produce a CTC cable with a higher number of total conductors without adding significant additional cost or requiring improved stranding equipment.

Figure 4:
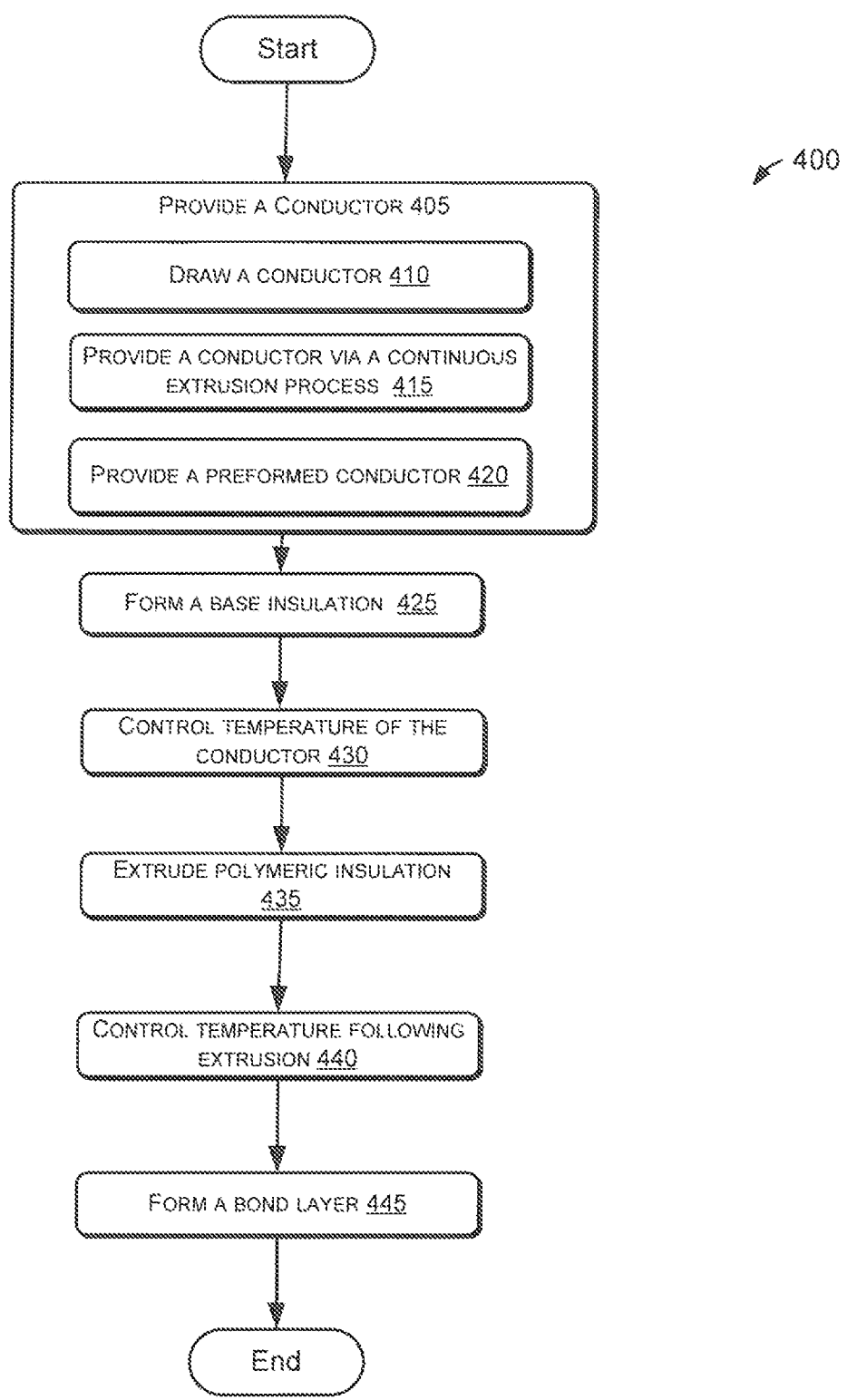
FIG. 4 illustrates a flow chart of an example method for forming a strand of a CTC cable, in accordance with an illustrative embodiment of the disclosure.
Figure 5:
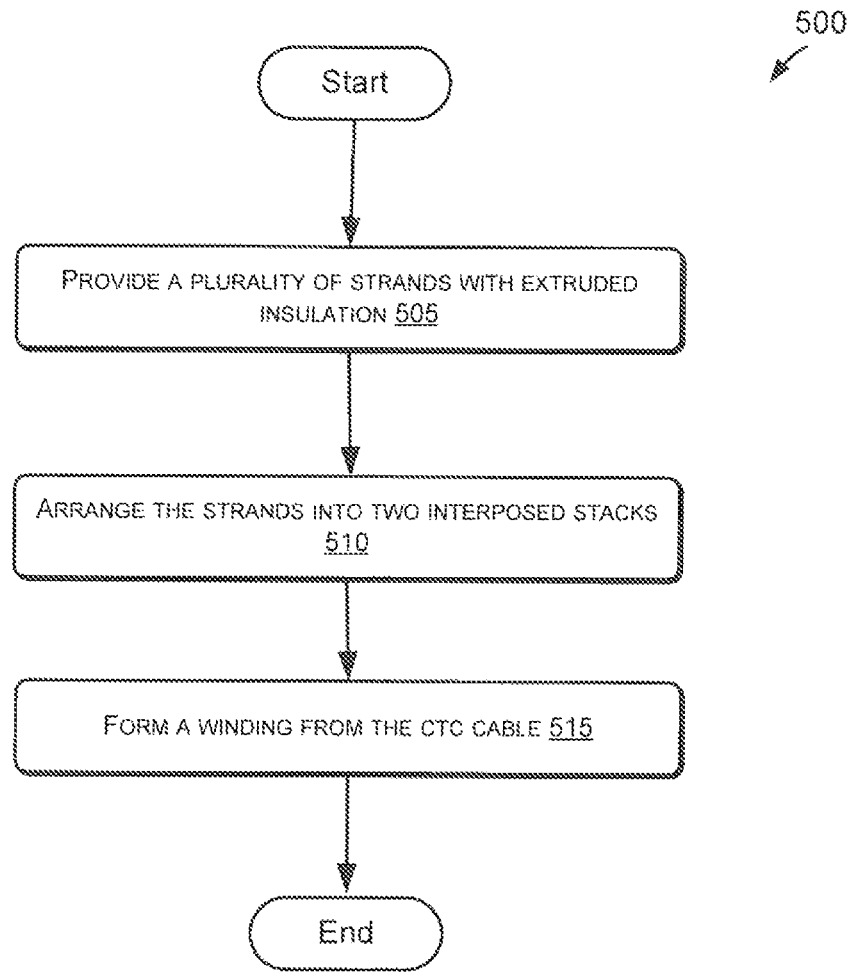
FIG. 5 illustrates a flow chart of an example method for forming a CTC cable, in accordance with an illustrative embodiment of the disclosure.

A wide variety of suitable methods and/or techniques may be utilized as desired to produce a strand and/or a CTC cable in accordance with various embodiments. In conjunction with these manufacturing techniques, a wide variety of suitable equipment, systems, machines, and/or devices may be utilized. FIG. 4 illustrates an example method 400 for forming a strand for use in a CTC cable. FIG. 5 illustrates an example method 500 for forming a cable from a plurality of strands, such as a plurality of strands formed in accordance with the method 400 illustrated in FIG. 4. Each of the methods 400, 500 are discussed in greater detail below.

Turning to FIG. 4, the method 400 for forming a CTC strand may begin at block 405. At block 405, one or more conductors may be provided for incorporation into a CTC strand. A wide variety of suitable techniques and/or a wide variety of suitable wire formation systems may be utilized to provide the conductor(s). For example, at block 410, a conductor may be drawn from a suitable input material (e.g., rod stock, a larger diameter conductor, etc.). As desired, a rod mill, rod breakdown machine, wire drawing system, or other suitable system may be utilized to draw a conductor. In certain embodiments, the system may receiving input material from a payoff or other suitable source and draw the input material through one or more dies in order to reduce the size of the input material to desired dimensions. Additionally, in certain embodiments, one or more flatteners and/or rollers may be used to modify the cross-sectional shape of the input material before and/or after drawing the input material through any of the dies. For example, rollers may be used to flatten one or more sides of input material in order to form a rectangular wire.

A wire drawing system may process either a single conductor or, alternatively, multiple conductors utilizing parallel wire lines. In certain embodiments, a wire drawing system may include any number of suitable capstans, dancers, and/or other devices that pull the input material through the dies and/or rollers. As desired, any number of motors may be utilized to power capstans, dancers, and/or other devices that exhibit a drawing force on the input material and/or the conductor output by the wire formation system. Additionally, the motors may be controlled by any number of suitable controllers and, as desired, synchronized with other components of a CTC strand formation system (e.g., components or systems that form insulation material, etc.).

As another example of providing a conductor, at block 415, a conductor may be provided via a suitable continuous extrusion or conform machine. For example, a conform machine may receive rod stock (or other suitable input material) from a payoff or other source, and the conform machine may process and/or manipulate the rod stock to produce a desired conductor via extrusion. As desired, operation of the conform machine may be synchronized with other components of a CTC strand formation system (e.g., insulation forming components, etc.) via one or more suitable controllers. Additionally, as desired, one or more methods or techniques of work hardening may be applied to achieve desired tensile properties of the conductor. For example, work hardening may be performed by bending a conductor around rollers and/or by applying similar techniques.

As yet another example of providing a conductor, at block 420, a preformed conductor may be provided or received from a suitable payoff or source. In other words, a conductor may be preformed in an offline process or obtained from an external supplier. Thus, it may not be necessary to provide a wire formation system. The conductor may have any suitable dimensions as specified for a desired magnet wire product.

At block 425, which may be optional in certain embodiments, one or more base layers of material may be formed around the conductor. A wide variety of suitable types of base layers may be formed as desired in various embodiments, such as one or more semi-conductive layers, one or more tape layers, and/or one or more enamel layers. For example, one or more layers of enamel may be formed on the conductor. In the event that one or more base enamel layers are formed, a conductor may be passed through one or more enameling ovens. In certain embodiments, one or more dies may be incorporated into the enameling oven or provided prior to a conductor entering the oven, and varnish may be applied to the conductor as it is passed through the die(s). In other embodiments, varnish may be dripped onto the conductor either prior to or after the conductor enters the enameling oven. After application of the varnish, the enameling oven may heat cure the varnish and/or evaporate any solvents mixed or blended with the varnish in order to complete the formation of an enamel layer. The process for applying an enamel layer to the conductor may be repeated as many times as desired in order to obtain a desired enamel build thickness.

As another example of forming a base layer, one or more semi-conductive layers that include semi-conductive and/or conductive material may be formed on the conductor. In certain embodiments, a semi-conductive layer may be formed in a similar manner to an enamel layer. In other embodiments, a semi-conductive layer may be extruded onto the conductor. As yet another example of forming a base layer, at least one tape or wrap may be formed around the conductor via a suitable tape applicator.

In certain embodiments, once a conductor is provided (e.g., provided via a wire formation system, provided via a conform process, etc.), the conductor may be passed through any number of other components prior to reaching a downstream system that forms insulation (e.g., a system that forms a base layer, an extrusion system, etc.). For example, the conductor may be passed through one or more cleaning apparatus and/or an annealer. The cleaning apparatus may wipe or otherwise remove residual particles from the conductor following the drawing or conform process. The annealer may soften the conductor by heat treatment in order to achieve desired tensile strength, elongation, and/or spring back.

According to an aspect of the disclosure, at least one layer of extruded material may be formed on a conductor. At block 430, the temperature of the conductor may be controlled prior to the extrusion process. For example, the conductor may be passed through one or more heating devices in order to attain a desired temperature prior to the extrusion process. The heating devices may include any suitable devices configured to increase or raise the temperature of the conductor, such as one or more heating coils, heaters, ovens, etc. As necessary, one or more cooling devices may also be utilized. The temperature of the conductor may be adjusted or controlled to achieve a wide variety of suitable values prior to extrusion. For example, in certain embodiments, the temperature may be controlled to approximately 200° C. or greater prior to extrusion. As another example, temperature may be controlled to approximately 380° C. or greater prior to extrusion. Controlling or maintaining the temperature at this level may facilitate adhesion between the extruded material and the underling conductor or base layer(s). In this regard, the use of a separate adhesive layer may be avoided.

Polymeric material may be extruded onto the conductor at block 435. As desired, a single extruded layer or multiple extruded layers may be formed. A wide variety of suitable extrusion devices may be configured to extrude polymeric insulation material. These devices may include any number of suitable extrusion heads and/or other devices configured to apply a desired amount of material. As desired, the flow rates of the extruded material may be controlled in order to obtain a desired thickness. Additionally, in certain embodiments, one or more extrusion dies may be utilized to control the thickness and/or shape of the extruded insulation. In embodiments in which a CTC strand includes a plurality of conductors, extruded material may be either separately formed on each of the conductors or, alternatively, extruded between and at least partially around the plurality of conductors.

At block 440, the temperature of the conductor and associated extruded insulation may be controlled following the extrusion process. In certain embodiments, the extruded insulation may be heated following extrusion. This heating may maintain a desired post-extrusion temperature and/or assist in attaining a desired crystallinity. Additionally, in certain embodiments, the process of cooling the extruded insulation prior to taking up the finished strand may be controlled, for example, with a liquid bath. As desired, the temperature of the liquid in a liquid bath may be controlled via recycling liquid. Additionally, the cooling rate may be controlled as a function of controlling the liquid temperature and/or establishing a desired length of the quencher. Controlling the cooling rate of the extruded insulation may also assist in achieving desirable characteristics, such as a desired crystallinity.

At block 445, a bond layer may optionally be formed on the strand. For example, one or more dies may be utilized to apply a bond material to the conductor. In certain embodiments, the bond material may be applied in a liquid form, and the strand may be cooled in order to solidify the bond material. In this regard, the strand may later be heated in order to activate the bond material. The method 400 may then end following block 445.

As desired in various embodiments, a plurality of the operations involved in forming a strand may be performed in a tandem or continuous manner. For example, a conductor may be drawn or otherwise provided, and one or more layers of insulation (e.g., a base layer, an extruded layer, etc.) may be formed in a tandem manner. Alternatively, a conductor may be taken up between one or more operations of the strand formation process. To the extent that operations are formed in a tandem manner, one or more synchronization devices may be utilized, such as capstans, dancers, flyers, load cells, and/or various combinations thereof. Additionally, as desired in various embodiments, the synchronization device(s) may be controlled by one or more suitable controllers (e.g., programmable logic controllers, computers, microcontrollers, servers, other computing devices, etc.) in order to match or approximately match an operational speed of the tandem processes and/or devices.

Turning now to FIG. 5, an example method 500 for forming a CTC cable from a plurality of strands is illustrated. The method 500 may begin at block 505. At block 505, a plurality of strands may be provided. In certain embodiments, each of the strands may include extruded insulation material formed on one or more associated conductors. For example, each of the strands may be formed in accordance with the method 400 of FIG. 4.

At block 510, the provided strands may be arranged into two stacks, and at least a portion of the strands may be interposed between the two stacks in order to form a CTC cable. Optionally, a suitable separator, such as a paper strip, may be positioned between the two stacks. For example, the strands may be interposed such that each strand successively and repeatedly takes on each possible position within a cross-section of the CTC cable. Additionally, in certain embodiments, the plurality of strands may be connected in parallel at their ends. A wide variety of suitable CTC stranding devices and/or systems may be utilized to form the CTC cable from the strands. For example, a wide variety of commercially available stranding devices may be utilized.

Additionally, in certain embodiments, the formation of a plurality of strands and the formation of a CTC cable from the strands may be formed in a tandem process. In other embodiments, the formation of the strands and the CTC cable may be formed in separate offline processes. For example, formed strands may be accumulated and taken up, and the strands may subsequently be provided to a CTC stranding device to form a CTC cable.

At block 515, a wide variety of suitable configurations may be formed utilizing the CTC cable or the interposed strands. For example, a suitable winding may be formed for a transformer, motor, or generator. Typically, the winding is formed in an offline manner subsequent to the formation of the CTC cable. For example, a CTC manufacturer may form the CTC cable, and the cable may be shipped to a transformer or motor manufacturer that subsequently forms a suitable winding. Optionally, once the winding is formed, the CTC cable may be heated in order to activate the bond layers incorporated into the CTC cable. The method 500 may end following block 515.

The operations described and shown in the methods 500, 600 of FIGS. 5 and 6 may be carried out or performed in any suitable order as desired in various embodiments. Additionally, in certain embodiments, at least a portion of the operations may be carried out in parallel. Furthermore, in certain embodiments, less than or more than the operations described in FIGS. 5 and 6 may be performed.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A continuously transposed conductor (CTC) cable comprising:
    a plurality of electrically insulated strands connected in parallel at their ends, each strand comprising:
        a conductor; and
        an extruded insulation layer substantially free of solvents formed at least partially around the conductor.

2. The cable of claim 1, further comprising a bond layer formed on the extruded insulation layer of at least one strand, the bond layer having a lower melt temperature than the extruded insulation layer.

3. The cable of claim 2, wherein the bond layer is formed at least partially around the conductor.

4. The cable of claim 1, wherein the plurality of electrically insulated strands are formed into two interposed stacks, each strand successively and repeatedly taking on each possible position within a cross-section of the CTC cable.

5. The cable of claim 1, wherein the insulation layer is extruded directly on the conductor.

6. The cable of claim 1, wherein the extruded insulation layer comprises one or more polymeric insulation materials.

7. The cable of claim 1, wherein the extruded insulation layer comprises at least one of (i) polysulfone, (ii) polyphenylsulfone, (iii) polysulfide, (iv) polyphenylenesulfide, (v) polyetherkeytone, (vi) polyaryletherketone, or (vii) polyamide etherkeytone.

8. The cable of claim 1, wherein the extruded insulation layer is resistant to oil.

9. The cable of claim 1, wherein the extruded insulation layer has thermal index rating of at least approximately 105° C.

10. The cable of claim 1, wherein the extruded insulation layer has thermal index rating of at least approximately 200° C.

11. The cable of claim 1, wherein the extruded insulation layer is between approximately 0.001 inches and approximately 0.030 inches thick.

12. The cable of claim 2, wherein the bond layer is between approximately 0.0005 inches and approximately 0.010 inches thick.

13. The cable of claim 2, wherein the bond layer comprises one of (i) phenoxy resin, (ii) cross-linking phenoxy, (iii) phenoxy associates, or (iv) polysulfone.

14. The cable of claim 1, wherein the plurality of electrically insulated strands comprises between approximately 5 and approximately 85 strands.

15. The cable of claim 1, wherein at least one of the plurality of electrically insulated strands comprises a plurality of conductors.

16. The cable of claim 1, wherein each conductor comprises a substantially rectangular cross-section.

17. A continuously transposed conductor cable comprising:
    a plurality of electrically insulated strands arranged in two stacks with the plurality of strands successively transposed between the two stacks, each strand comprising:
        an electrically conductive core; and
        an extruded insulation layer substantially free of solvents formed directly on and at least partially around the conductive core.

18. The cable of claim 17, further comprising:
    a bond layer formed on the extruded insulation layer of at least one strand, the bond layer having a lower melt temperature than the extruded insulation layer.

19. The cable of claim 18, wherein the bond layer is formed at least partially around the extruded insulation layer.

20. The cable of claim 17, wherein the extruded insulation layer comprises one or more polymeric insulation materials.

21. The cable of claim 17, wherein the extruded insulation layer comprises at least one of (i) polysulfone, (ii) polyphenylsulfone, (iii) polysulfide, (iv) polyphenylenesulfide, (v) polyetherkeytone, (vi) polyaryletherketone, or (vii) polyamide etherkeytone.

22. The cable of claim 17, wherein the extruded insulation layer is resistant to oil.

23. The cable of claim 17, wherein the extruded insulation layer has thermal index rating of at least approximately 105° C.

24. The cable of claim 17, wherein the extruded insulation layer has thermal index rating of at least approximately 200° C.

25. The cable of claim 17, wherein the extruded insulation layer is between approximately 0.001 inches and approximately 0.030 inches thick.

26. The cable of claim 18, wherein the bond layer is between approximately 0.0005 inches and approximately 0.010 inches thick.

27. The cable of claim 18, wherein the bond layer comprises one of (i) phenoxy resin, (ii) cross-linking phenoxy, (iii) phenoxy associates, or (iv) polysulfone.

28. The cable of claim 17, wherein the plurality of electrically insulated strands comprises between approximately 5 and approximately 85 strands.

29. The cable of claim 17, wherein at least one of the plurality of electrically insulated strands comprises a plurality of electrically conductive cores.

30. The cable of claim 17, wherein each electrically conductive core comprises a substantially rectangular cross-section.

* * * * *